Dec. 2, 1941.  E. E. ARNOLD  2,265,018
TROLLEY POLE
Filed Jan. 23, 1940
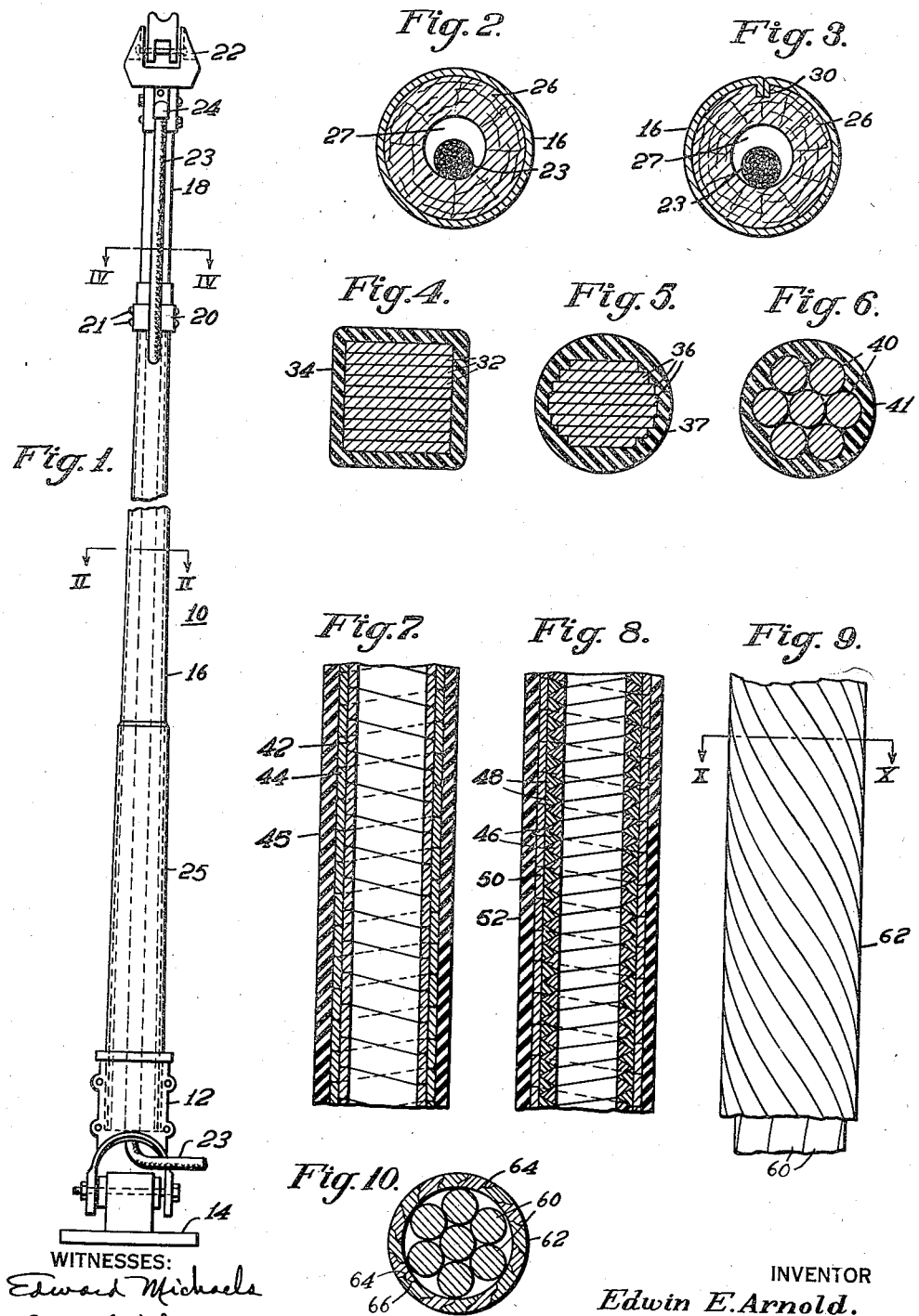
INVENTOR
Edwin E. Arnold.
BY
ATTORNEY Patented Dec. 2, 1941

2,265,018

UNITED STATES PATENT OFFICE 2,265,018

TROLLEY POLE

Edwin E. Arnold, Pittsburgh, Pa., assignor to Westinghouse Electric & Manufacturing Company, East Pittsburgh, Pa., a corporation of Pennsylvania Application January 23, 1940, Serial No. 315,171

10 Claims. (Cl. 191—64)

My invention relates, generally, to supports for current collectors, and it has reference, in particular to a trolley pole for supporting a current collector on an electrically operated vehicle.

In order to secure the most efficient operation of current collectors on electrically operated vehicles, it is desirable to reduce, as much as possible, the weight not only of the current collector but also of the trolley pole supporting it, while maintaining the necessary requirements of mechanical strength.

It is, therefore, generally stated, an object of my invention to provide a light-weight trolley pole having improved operating characteristics.

More specifically, it is an object of my invention to provide for reducing the weight of a trolley pole by utilizing a high strength thin-walled tubular casing having a light-weight reenforcing member positioned therein to produce the desired operating characteristics.

Another object of my invention is to provide for reenforcing a relatively thin-walled metallic tubular member by positioning a reenforcing core therein, not only for the purpose of reducing the normal deflection of the tubular member, but also to damp the vibration of the tubular member to render the contact of the current collector with the trolley conductor more steady and uniform.

A further object of the invention is to utilize a thin-walled tapered metallic tube for a trolley pole having a hollow reenforcing core of wood in which the current conducting cable may be positioned for supporting a current collector on an electrically operated vehicle.

Still another object of my invention is to provide a composite trolley pole having a thin-walled metallic tube with a light-weight reenforcing member positioned therein for preventing the deformation of the walls of the tube so that the metal of the tube may be safely stressed to relatively high values of stress.

Yet another object of the invention is to provide a trolley pole having a reenforced thin-walled tubular body member with a resilient damped support member at one end for supporting a current collector.

A still further object of the invention is to provide for supporting a current collector on a thin-walled tubular member by means of a resilient support member which is highly damped so as to produce a substantially "dead beat" connection.

Another important object of the invention is to provide a resilient support for a current collector having a plurality of resilient members encased by a rubber or similar composition sheath to provide a highly damped support.

Other objects will, in part, be obvious and will, in part, appear hereinafter.

In practicing my invention in a preferred form, a light-weight, high-strength trolley pole for supporting a current collector on an electrically operated vehicle may be provided by utilizing a composite pole comprising an elongated tubular member of a high-strength metal having relatively thin side walls, and a relatively light reenforcing member positioned therein for preventing deformation of the walls of the member, reducing the natural frequency of vibration thereof and introducing a damping effect. In order to prevent the transmission of undue shocks and vibrations to the tubular member from the current collector as it encounters irregularities in the trolley conductor, a highly damped resilient support member may be secured to the tubular member at the upper end for supporting the current collector.

For a more complete understanding of the nature and scope of my invention, reference may be had to the following detailed description, taken in connection with the accompanying drawing in which:

Figure 1 is an elevational rear view of a trolley pole embodying the principal features of my invention;

Fig. 2 is a cross-sectional view of the tubular member taken along the line II—II of Fig. 1;

Fig. 3 is a cross-sectional view of a modified form of tubular member for a trolley pole embodying the features of the invention;

Fig. 4 is a cross-sectional view of the resilient support member taken along the line IV—IV of Fig. 1;

Figs. 5 and 6 are cross-sectional views of modified forms of the resilient support member;

Figs. 7 and 8 are longitudinal sectional views of portions of further modifications of the resilient support member;

Fig. 9 is a side-elevational view of still another modification of the resilient support member; and Fig. 10 is a cross-section view of the resilient support member of Fig. 9, taken along the line X—X.

Referring particularly to Figure 1 of the drawing, the reference numeral 10 may denote generally a trolley pole which is to be supported on the roof of an electrically operated vehicle (not shown) in any manner well-known in the art, by means such as, for example, the socket 12, which may be pivotally mounted in any suitable manner on a base 14 adapted to be attached to the roof of the vehicle.

The trolley pole 10 may comprise a tubular metallic body member 16, having a resilient support member 18 secured thereto at the upper end by suitable means, such as the collar 20 and bolts or rivets 21, for supporting a current collector 22 of any suitable construction. An insulated cable 23 may be connected to the current collector 22 by means of a terminal 24 for conducting current therefrom.

With a view to provide a light-weight trolley pole of high strength, which has suitable operating characteristics, including a relatively low frequency of vibration, so as not to transmit relatively high frequency vibrations to the body of the vehicle, the tubular body member 16 may, as illustrated in Figs. 1 and 2 of the drawing, comprise a relatively thin-walled tubular member of a high-strength ferrous, non-ferrous or alloy metal. For example, the tubular member 16 may be formed in any manner known to the art, with or without a seam, and either plain, or tapered as shown in Fig. 1. The tubular member may be made of any suitable high-strength metal, such as for example, a carbon steel containing approximately from .30 to .50% carbon and properly heat treated to bring out its available high physical properties, a high-strength stainless steel, or a high-strength aluminum alloy, having a wall thickness approximately one-half as great as heretofore customarily used.

In order to take full advantage of the high tensile and compressive strengths of such a relatively thin-walled tubular member, suitable means may be provided for reenforcing the tubular member at the lower end, where the stresses, which are incurred principally by bending, are a maximum. For example, an auxiliary member such as the tubular sleeve 25 may be secured to the lower end of the tubular member 16, either inside or outside as shown, in any suitable manner, such as for example, by welding.

For the purpose of enabling the high tensile and compressive strength of a high-strength material to be used to the best advantage in the relatively thin-walled tubular member so as to secure the maximum safe operating strength for a given weight, and produce a trolley pole having the desired operating characteristics, a light-weight filler or reenforcing member 26 having a relatively high degree of inherent damping may be positioned within the tubular member 16 in engagement with the side walls thereof. By thus resisting deformation of the side walls, either from blows caused by striking obstructions, or by the buckling of the side walls in compression under load, the high-strength metal of the tubular member may be safely stressed to values far in excess of those to which the tubular member alone may be safely stressed. The inside reenforcing member 26 may be of any suitable material such as, for example, wood, a bonded paper product, a fibrous material impregnated with a phenolic resin and capable of hardening under heat and pressure, or any of a number of other organic fibrous materials which have or may be given sufficient body to prevent deformation of the walls of the tubular member, reduce the frequency of vibration thereof and also damp the movement of the tubular member.

A core of California mahogany or of spruce positioned within the tubular member 16 has been found to give excellent results, and may be provided with a central opening 27 in which the current collector cable 23 may be positioned. Such a reenforcing core not only prevents deformation of the side walls of the tubular member so as to prevent buckling thereof under load, but it also assists in reducing the amount of deflection of the tubular member for a given loading. The core furthermore acts as a damper, damping out vibrations of the tubular member and preventing "whipping" thereof in operation. Thus it reduces the possibility of dewiring the current collector, and improves its current collecting characteristics.

Referring to Fig. 3, it may be seen that the tubular member 16 may, if desired, be formed about the reenforcing member 26, instead of the inside reenforcing member 26 being positioned therein after the tubular member is formed. For example, a strip of any high-strength metal may be wrapped about the reenforcing member 26 in any suitable manner, having, for example, adjacent inturned edge portions 30, which may be pressed into the reenforcing member 26 to lock therewith and form a stiffening rib or seam along one side of the member.

Referring to Fig. 4, which is a cross-section view of one form of resilient support 18, the reference numeral 32 may denote a plurality of substantially flat elongated resilient members of any suitable material such as, for example, spring steel, phosphor bronze, or the like, which may be stacked flatwise, with their width substantially parallel to the axis of bending of the member 18. The members 32 may be secured together in any suitable manner, such as by means of a sheath of rubber 34 or other suitable material, which may be secured to the members by vulcanizing. A resilient support member 18 may thus be provided in which the sheath 34 not only secures the resilient members 32 to form an integral unit, but also functions to damp any bending movement thereof. By using a resilient connector or support member 18 having a cross-section such as shown in Fig. 4 with the resilient members 32 so stacked as to be normally deflected in the flatwise direction in operation, a resilient support may be provided which is highly flexible and substantially "dead beat" in the flatwise or vertical direction, so as to preclude setting up undue vibrations in the tubular member 16 and substantially rigid in the sideways or horizontal direction. The support member may thus bend readily in the vertical direction to absorb shocks transmitted to the current collector from the trolley conductor, and is sufficiently rigid to prevent undesirable side-sway of the current collector.

As shown in Fig. 5, the resilient support member may comprise a plurality of resilient members 36 having different widths, stacked flatwise with the edges in stepped relation so as to provide a symmetrical cross-section of diminishing width at the top and bottom. A sheath 37 of rubber or other suitable material may be moulded thereabout to produce a support member 18 having a circular cross-section, with substantially the same operating characteristics as the rectangular shape support member of Fig. 4.

Referring to Fig. 6, which illustrates another modification of the support member, the reference numeral 40 may denote a plurality of wires of a suitable springy material, arranged in a manner well-known in the art, such as in transmission cables or the like, and having a suitable sheath 41 of rubber or the like, formed or vulcanized thereabout to provide a resilient support member which is highly damped.

In Fig. 7, a further modification of the support member is shown, in which the reference numeral 42 denotes a coil spring which may be formed by a plurality of adjacent turns of a ribbon spring wound flatwise in a helix. The reference numeral 44 denotes a similar coil of a flatwise wound ribbon spring positioned about the coil 42 with the turns thereof preferably wound in the opposite direction. In order to provide for so damping the lateral bending movement of the concentrically wound coils 42 and 44, a sheath 45 may be secured about the member 44 by any suitable means, such as, for example, by vulcanizing a layer of rubber thereabouts, so as to produce a substantially "dead beat" resilient support.

Referring to Fig. 8, which illustrates another form of resilient support member, it may be seen that the support member may, for example, comprise interlocked helically wound coil springs of spring wire having a triangular cross-section. For example, the coil spring 46 may be formed with one side of the triangular shaped wire facing inwardly, and the coil spring 48 may be formed so that the turns thereof lie in the grooves between adjacent turns of the coil spring 46, so as to lock the springs together. In order to further strengthen the support member and damp lateral bending thereof, a coil spring 50 of helically wound turns of ribbon spring may be positioned about the springs 46 and 48, and a sheath 52 of rubber, or the like, secured thereabouts in any suitable manner, such as by vulcanizing. In this manner a highly damped resilient support member may be provided which is substantially "dead beat" and thus transmits substantially no shocks or vibrations from the current collector to the tubular pole member.

Referring to Figs. 9 and 10, the reference numeral 60 may denote generally a plurality of wires of steel, or other spring material, formed in a manner well-known in the art of cable-making to provide a central core, and having a protective sheath thereabout. The sheath may, for example, be formed of a plurality of substantially ribbon-like wires 62 spirally wound about the core and having overlapping edge portions 64 and 66 which cooperate to maintain the wires 60 in locked relation with each other to provide a smooth outer surface. By providing a suitable length of such lock-wire surface cable, and suitably securing the ends of the outer surface, such as by soldering, brazing, or welding the ends thereof, a resilient highly damped support 18 may be provided for connecting the current collector 22 to the tubular member 16.

With composite trolley poles of the type embodied in my invention, it had been found that such a reenforced, relatively thin-walled tubular member of a high-strength steel may be provided, having a weight far less than that of the conventional type trolley pole. For example, by using a tubular member of high-strength, heat-treated, carbon steel, having a ratio of inside diameter to outside diameter on the order of ninety-five hundredths adjacent the lower end, the strength of the member in bending may be increased by as much as two-thirds over the strength in bending of the tubular member alone by providing the tubular member with a reenforcing core of a relatively strong, light-weight material such as, for example, spruce, California mahogany, or the like, in accordance with my invention. The increase in weight due to such a reenforcing core amounts to only approximately one-half of the weight of the tubular member alone. To secure the same increase of strength by increasing the thickness of the walls of the tubular member would result in an increase in weight of more than two-thirds the original weight of the tubular member also. Thus, by using a composite trolley pole embodying the feature of my invention, a saving in weight of approximately one-quarter may be effected in the trolley pole.

In addition, such a reenforcing core assists in damping the vibration of the tubular member and lowers the natural frequency of vibration thereof. The reenforcing core also reduces the deflection of the thin-walled tubular member under load, and prevents premature failure of the tubular member by buckling of the wall in compression. Improved operation of the current collector may thus be secured, since there is less tendency for the composite pole to "whip" when rounding a curve at a relatively high speed, or to vibrate when the current collector strikes in irregularity in a trolley conductor. The centrifugal force tending to force the current collector in a radial direction on curves is also greatly reduced, so that dewirements of the current collector are thus less likely to occur when using the composite trolley pole, and improved current collecting characteristics are secured.

From the above description, taken in connection with the accompanying drawing, it will be apparent that my invention provides a light-weight trolley pole of high strength. By utilizing a reenforcing core with a relatively thin-walled, high-strength tubular member, the advantages of light weight and improved operating characteristics may be secured without any sacrifice of mechanical strength. By utilizing a highly damped resilient support with a relatively thin-walled tubular member for supporting the current collector, the effects of shocks and vibrations normally transmitted to the tubular member from the current collector are greatly reduced, so that the material of the thin-walled tubular member may be safely stressed to values much higher than where the tubular member alone is used, without danger of failure of the tubular member from the transmission of sudden blows thereto. In addition, by the combined action of the support member and the reenforcing member, which are both effective in reducing the tendency of the trolley pole to vibrate, a trolley pole may be provided which is sufficiently rigid to maintain the current collector in contact with the trolley conductor to secure the desired contact pressure, and yet resilient enough to absorb shocks and vibrations transmitted to the current collector from the trolley conductor, so as to give smooth and silient operation of the current collector.

Since certain changes may be made in the above description, and different embodiments of the invention may be made without departing from the spirit thereof, it is intended that all the matter contained in the above description, or shown in the accompanying drawing, shall be considered as illustrative, and not in a limiting sense.

I claim as my invention:

1. A current collector support comprising, a relatively flexible thin-walled metallic tubular member having a relatively high natural frequency of vibration for mounting on an electrically operated vehicle and a relatively highly damped resilient connector having a natural frequency of vibration lower than the natural period of the tubular member interposed between the tubular member and a current collector supported thereby.

2. A trolley pole comprising, a relatively flexible elongated thin-walled tubular member of a high strength metal for supporting a current collector, and a non-metallic filler for damping the vibrations of the tubular member.

3. A trolley pole adapted to be subject to transverse vibratory forces comprising, a relatively thin-walled resilient tubular member of a high-strength metal, and a non-metallic core having a high degree of inherent damping positioned within the tubular member for reenforcing the tubular member and damping the vibration of the tubular member.

4. The combination in a trolley pole subject to transverse bending, of an elongated relatively flexible tubular steel support having relatively thin walls and a relatively high natural frequency, and a core of wood positioned within the support to reduce the natural frequency of vibration of the tubular support.

5. In a support for a current collector, in combination, an elongated metallic tubular member of high-strength steel having extremly thin side walls so as to be relatively flexible about a transverse axis, and a relatively light-weight damping member positioned along the metallic tubular member in engagement with the side walls thereof having a relatively high degree of inherent damping.

6. A composite trolley pole comprising, a relatively flexible high-strength thin-walled steel tubular member, a reenforcing core having a lower natural frequency of vibration than the tubular member positioned within the tubular member to damp the vibrations thereof, and a highly damped resilient support secured to one end of the tubular member to prevent the transmission of relatively high frequency vibrations to the tubular member from a current collector mounted on the support.

7. The combination in a trolley pole, of a relatively flexible thin-walled high-strength steel tubular member, a core member of organic fibrous material positioned within the tubular member for lowering the frequency and damping the natural vibration of the tubular member, and means positioned at one end of the tubular member having a resilient metallic member with a layer of rubber vulcanized thereto to provide a highly damped connector for supporting a current collector.

8. A support for attaching a current collector to a trolley pole comprising, a plurality of substantially coextensive helically disposed elongated resilient metallic members, a sheath positioned about the members for securing the members in substantially fixed relation to each other so as to highly dampen the movement of the members, and means for securing the support to the trolley pole and to the current collector.

9. A device for supporting a current collector on a trolley pole comprising, a plurality of relatively thin, elongated, resilient metallic members helically twisted in cable relation, and a sheath of soft rubber disposed about the members to secure them in operating relation.

10. A trolley pole comprising, a relatively flexible elongated tapered thin-walled tube of high-strength steel having a relatively high natural frequency of transverse vibration, and a hollow core of wood having a relatively high damping effect positioned within the tube in engagement with the walls of the tube.

EDWIN E. ARNOLD.

DISCLAIMER 2,265,018.—*Edwin E. Arnold*, Pittsburgh, Pa. TROLLEY POLE. Patent dated December 2, 1941. Disclaimer filed November 7, 1942, by the assignee, *Westinghouse Electric & Manufacturing Company*.

Hereby enters this disclaimer to claim 1 of said patent.

[*Official Gazette December 1, 1942.*]